(12) United States Patent
Radisson et al.

(10) Patent No.: US 11,486,861 B2
(45) Date of Patent: Nov. 1, 2022

(54) DEVICE FOR EXAMINING THE INTERIOR OF A PIPE USING MULTI-ELEMENT ULTRASOUND

(71) Applicant: Societe des Transports Petroliers Par Pipeline Trapil, Puteaux (FR)

(72) Inventors: Marc Radisson, Saint-Prix (FR); Stéphane Benichou, Villiers le Bel (FR)

(73) Assignee: Societe des Transports Petroliers Par Pipeline Trapil, Puteaux (FR)

( * ) Notice: Subject to any disclaimer, the term of this patent is extended or adjusted under 35 U.S.C. 154(b) by 121 days.

(21) Appl. No.: 17/172,497

(22) Filed: Feb. 10, 2021

(65) Prior Publication Data

US 2021/0255150 A1  Aug. 19, 2021

(30) Foreign Application Priority Data

Feb. 17, 2020  (FR) ...................................... 2001536

(51) Int. Cl.
*G01N 29/04*  (2006.01)
*G01N 29/26*  (2006.01)
(Continued)

(52) U.S. Cl.
CPC ......... *G01N 29/262* (2013.01); *G01N 29/043* (2013.01); *G01N 29/07* (2013.01);
(Continued)

(58) Field of Classification Search
CPC .... G01N 29/262; G01N 29/043; G01N 29/07; G01N 29/225; G01N 2291/106;
(Continued)

(56) References Cited

U.S. PATENT DOCUMENTS 5,963,042 A * 10/1999 Suyama ................. G01N 22/02
324/637
6,243,657 B1 * 6/2001 Tuck .................... G01N 29/265
324/207.13

(Continued)

FOREIGN PATENT DOCUMENTS

CN  110618197 A  12/2019
EP  1333277 A2  8/2003
GB  2020023 A  7/1979

*Primary Examiner* — Jacques M Saint Surin
(74) *Attorney, Agent, or Firm* — Harness, Dickey & Pierce, PLC

(57) ABSTRACT

A device for examining the interior of a pipe using multi-element ultrasound technology, finding application in the detection of defects in the wall of a tubular pipe or the verification of the characteristics of the wall of a tubular pipe is disclosed. The device is designed to be placed inside a fluid transport pipe and to move under the action of the transported fluid, to detect defects in, or check characteristics of, the wall of the pipe. The device has a circumference and comprises a plurality of ultrasonic sensors distributed over its circumference and each formed by a plurality of transmitters and a plurality of reception antennas. The device also includes an electronic controller configured to control each sensor and to receive and record the information measured by the sensors.

13 Claims, 3 Drawing Sheets

(51) Int. Cl.
  *G01N 29/07* (2006.01)
  *G01N 29/22* (2006.01)
(52) U.S. Cl.
  CPC ..... *G01N 29/225* (2013.01); *G01N 2291/106* (2013.01); *G01N 2291/2636* (2013.01)
(58) Field of Classification Search
  CPC ... G01N 2291/2636; G01N 2291/0421; G01N 2291/0422; G01N 2291/056; F17D 5/06
  USPC .......................................................... 73/592
  See application file for complete search history.

(56) References Cited

U.S. PATENT DOCUMENTS

| | | | | |
|---|---|---|---|---|
| 7,698,937 | B2 * | 4/2010 | Neidhardt | E21B 47/08 |
| | | | | 73/152.57 |
| 8,438,929 | B2 * | 5/2013 | Metala | G01M 13/00 |
| | | | | 73/660 |
| 9,188,567 | B2 * | 11/2015 | MacLauchlan | G01N 29/44 |
| 2016/0025684 | A1 * | 1/2016 | Deneuville | G01N 29/262 |
| | | | | 73/622 |

* cited by examiner

DEVICE FOR EXAMINING THE INTERIOR OF A PIPE USING MULTI-ELEMENT ULTRASOUND

CROSS-REFERENCE TO RELATED APPLICATIONS

This application claims priority to French Patent Application Serial No. 2001536, filed on Feb. 17, 2020, which is incorporated by reference herein.

BACKGROUND AND SUMMARY

The present invention relates to a device for examining the interior of a pipe using multi-element or phased array ultrasound technology. It finds particular application to devices sometimes called "scrapers" for the detection of defects in the wall of a tubular pipe or the verification of the characteristics of the wall of a tubular pipe. Such a device is designed to inspect tubular conduits intended to transport a fluid, in particular a liquid of a homogeneous nature. This can be, for example, water, refined hydrocarbons or certain crude oils.

European Patent 1,333,277 discloses, for example, a device which uses phased array ultrasound technology, in which a certain number of ultrasonic sensors allow the emission and reception of sound waves, the characteristics of which vary according to the obstacle encountered, which makes it possible to deduce certain information relating to the characteristics of the wall of the pipe. Each sensor is made up of a series of transmitters and receivers. The on-board control electronics allow reception and recording of the information measured by the sensors.

However, such a device does not make it possible to carry out pipe inspections using a sufficient degree of finesse and precision, for a wide variety of defects or characteristics to be analyzed, sufficiently quickly, all using a compact form facilitating movement inside the pipe or conduit. However, certain combinations of defects may be particularly critical for a particular pipe or conduit, so that it is necessary to be able to configure the device adequately for the detection of these combinations of defects.

One of the aims of the invention is therefore in particular to solve the aforementioned problems. Thus, the object of the invention is in particular to propose a device for examining the interior of a multi-element ultrasound pipe, which is autonomous, particularly compact and which quickly detects a wide variety of defects and combinations of defects.

The invention thus provides, according to a first aspect, a device for examining the interior of a pipe using multi-element ultrasound, configured to be placed inside a tubular pipe for transporting a fluid, and to move under the action of the fluid transported in said pipe to detect defects in, or verify characteristics of, the wall of the pipe, the device having a circumference and comprising a plurality of ultrasonic sensors distributed over said circumference and each formed of a plurality of transmitters and a plurality of reception antennas, the device also comprising electronic control means configured to control each sensor, and to receive and record the information measured by said sensors. The sensors are grouped into a first group of sensors the transmitters of which are adapted to deliver a longitudinal sound wave in a first direction of incidence normal to the circumference at the position of the corresponding transmitter, and a second group of sensors the transmitters of which are adapted to deliver a transverse sound wave in a second direction of incidence forming a non-zero angle of incidence, preferably substantially equal to 45 degrees, with the normal to the circumference in the position of the corresponding transmitter. The electronic control means are configured to control each sensor of the first and second group individually, and each transmitter and receiver of each of these said sensors, according to a configurable control program and according to the characteristics of the defects to be detected in the wall and/or characteristics of the wall to be checked.

According to certain embodiments, the device also comprises one or more of the following characteristics, taken in isolation or in any technically possible combination:

- the electronic control means are configured to apply to transmission and/or reception of the transmitters and/or receivers of each sensor of the first and of the second group a specific delay according to a configurable focusing delay law, so as to vary electronically and in a manner specific to each sensor a focusing distance of the wave beam emitted by said sensor.
- the electronic control means are configured to apply to transmission and/or reception of each of the transmitters and/or receivers of each sensor from the second group, a specific delay according to a configurable deflection delay law, so as to vary electronically and in a manner specific for each sensor an angle of incidence of the wave beam emitted by said sensor.
- the sensors of the first group are distributed circumferentially over one or more, preferably two, rows, and the electronic control means are configured to allow electronic scanning by the wave beams emitted by all the rows of sensors of the first group.
- the sensors of the second group are distributed circumferentially over one or more, preferably three, rows, and the electronic control means are configured to allow electronic scanning by the wave beams emitted by all the rows of sensors of the second group.
- the sensors are provided with active openings facing their transmitters, and the electronic control means are configured to sequentially activate the openings of the sensors of a given row, to allow electronic scanning.
- the electronic control means are configured to allow electronic scanning by the wave beams emitted by all the rows of sensors according to a determined step between each switching operation.
- the electronic control means are configured to sequentially activate the openings of the sensors of a given row according to the determined step between each switching operation, to allow electronic scanning according to a circumferential scanning resolution corresponding to said determined step between each switching operation.
- the electronic control means are configured to vary the number of transmitters and receivers used in a given sensor, so as to varying the size of the focal spot of the wave beam projected by the given sensor at a given focal distance.
- the device comprises a configurable-frequency clock, and the electronic control means are configured to trigger the measurements by the ultrasound sensors at said frequency.
- the device comprises at least one sensor of the axial odometer type, and the electronic control means are configured to associate the information obtained by ultrasonic sensors with position information obtained by the axial odometer type sensor(s).

the step between taking each measurement of position by the sensor or sensors of the axial odometer type is configurable, and the electronic control means are configured to trigger measurements by the ultrasonic sensors according to the step between taking each measurement of position.

the device comprises at least one sensor for measuring a propagation speed of the ultrasonic wave beams emitted by the ultrasound sensors or ultrasonic waves emitted by the transmitters of the ultrasonic sensors, and the control means are configured to receive and record information measured by said at least one sensor for measuring propagation speed.

the device comprises a low frequency electromagnetic transmitter capable, when the device is placed inside a pipe, of transmitting to the surface outside of said wave pipe, so as to allow monitoring and detection of the device inside the pipe from outside the pipe.

the device comprises centering means, capable of ensuring centering of the device in a pipe.

Thus, the device of the invention makes it possible to examine the interior of a pipe by rapidly detecting a wide variety of defects and combinations of defects, and by checking certain geometric characteristics of a pipe, and also allows complete inspection of the volume of a weld region.

BRIEF DESCRIPTION OF THE DRAWINGS

The characteristics and advantages of the invention will appear on reading the description which follows, given only by way of example, and not limiting, with reference to the following appended drawings.

DETAILED DESCRIPTION

Figure 1:
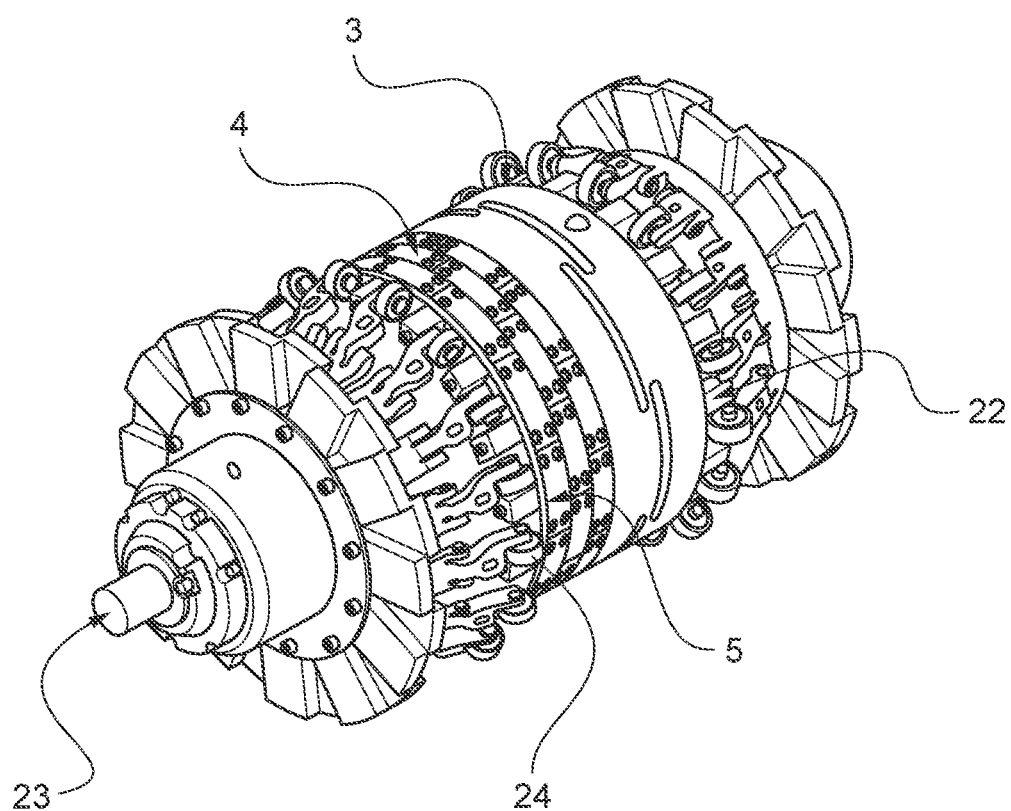
FIG. 1 is a diagrammatic representation of an example of a device of the invention.
Figure 2:
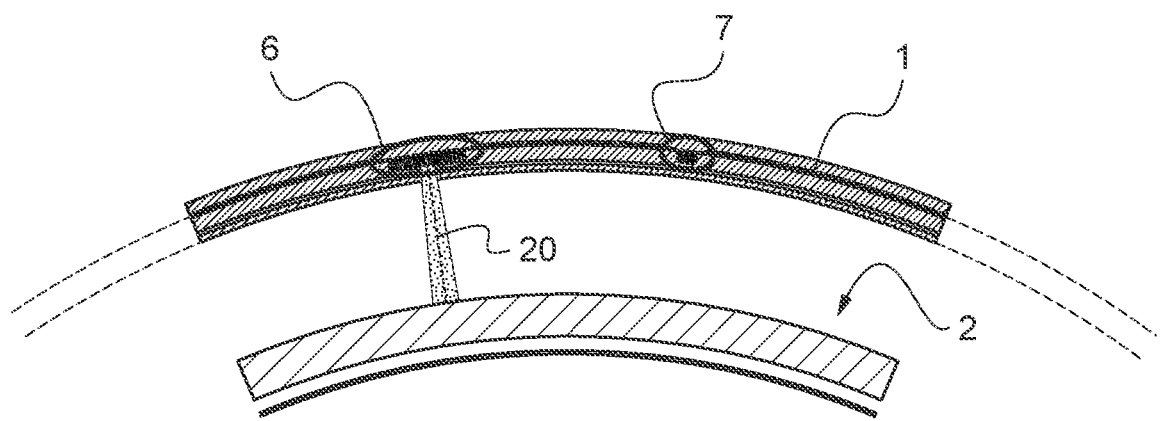
FIG. 2 is a diagrammatic representation of an example of verification of the characteristics of the wall of a pipe by the device of the invention.
Figure 3:
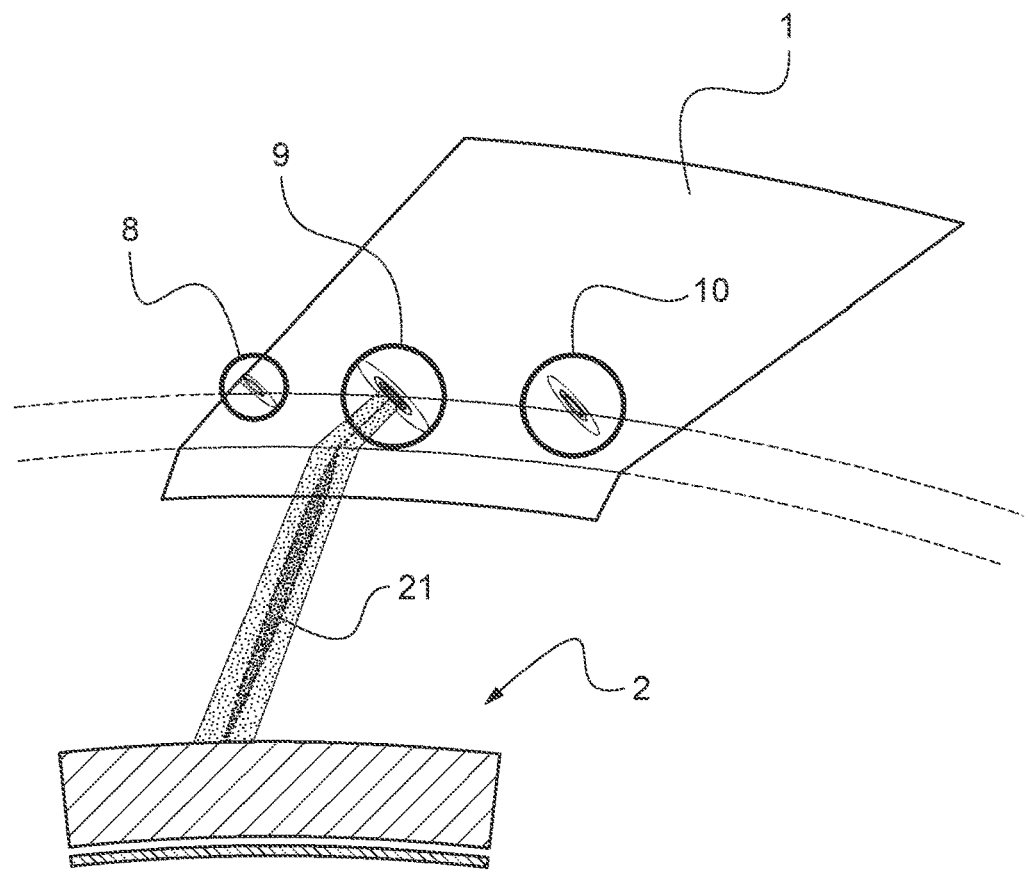
FIG. 3 is a diagrammatic representation of an example of detection of defects in the wall of a pipe by the device of the invention.

FIG. 1 shows an example of a device for examining the interior of a multi-element ultrasonic pipe, according to the invention. This device is intended to be placed inside a tubular pipe for transporting a fluid. It moves inside the pipe under the action of the transported fluid, to detect defects 8 to 18 in the wall 1 of this pipe, as illustrated in the examples in FIGS. 3 to 6, or check the characteristics 6, 7 of the wall 1 of this pipe as illustrated in FIG. 2.

The device has a circumference 2. A plurality of ultrasonic sensors 3, 4 are distributed over this circumference 2. Conventionally, each of the sensors 3, 4 is formed by a plurality of transmitters and a plurality of receivers or reception antennas, not visible in the drawings.

The device also comprising electronic control means which are not visible in the drawings because they are arranged inside connected to the various sensors and to the various transmitters and receivers of these sensors. These electronic control means are configured to control each sensor 3, 4, and to receive and record the information measured by these sensors 3, 4.

These sensors 3, 4 are grouped into two groups. In the first group, the transmitters of the sensors 3 are adapted to deliver a sound wave 20, illustrated for example in FIG. 2. This sound wave 20 is a longitudinal wave in a first direction of incidence normal to the circumference 2 in the position of the corresponding transmitter. In the second group, the transmitters of the sensors 4 are adapted to deliver a sound wave 21, illustrated for example in FIGS. 3 to 6. This sound wave 21 is a transverse wave in a second direction of incidence forming an angle of incidence which is non-zero, preferably substantially equal to 45 degrees, with the normal to the circumference 2 in the position of the corresponding transmitter.

The electronic control means are configured to individually control each sensor 3, 4 of the first and second group, and each transmitter and receiver of each of these sensors 3, 4. Control is carried out according to a configurable control program and according to the characteristics defects 8 to 18 to be detected in wall 1, and/or characteristics 6, 7 of wall 1 to be checked.

The electronic control means are configured to apply a specific delay to the transmission and/or reception of each of the transmitters and/or receivers of each sensor 3, 4 of the first and second groups. The application of this delay is carried out according to a configurable focusing delay law. In this way, the focusing distance of the wave beam 20, 21 emitted by the sensor 3, 4 in question can be varied electronically and specifically for each sensor 3, 4.

Furthermore, the electronic control means are configured to apply another specific delay to the transmission and/or reception of each of the transmitters and/or receivers of each sensor 4 of the second group. The application of this delay is carried out according to a configurable deflection delay law. In this way, the angle of incidence of the wave beam 21 emitted by said sensor 4 can be varied electronically and specifically for each sensor 4.

As can be seen in FIG. 1, the sensors 3 of the first group are distributed circumferentially. They can be distributed over one or more rows. In the example in FIG. 1, they are distributed in two rows. The electronic control means are configured to allow electronic scanning by the wave beams 20 emitted by all of the rows of sensors 3 of the first group.

As can also be seen in FIG. 1, the sensors 4 of the second group are also distributed circumferentially. They can be distributed over one or more rows. In the example in FIG. 1, they are distributed in three rows. The electronic control means are configured to allow electronic scanning by the wave beams 21 emitted by all of the rows of sensors 4 of the second group.

More specifically, the sensors 3, 4 of the two groups are provided using active openings facing their transmitters, not bearing reference numerals in the drawings. The electronic control means are configured to sequentially activate the openings of the sensors 3, 4 of a given row, to allow electronic scanning. The parameters of a step between each switching operation can be set. The electronic control means are thus configured to allow electronic scanning by the wave beams 20, 21 emitted by all of the rows of sensors 3, 4 according to this parameterized step between each switching operation.

Figure 5:
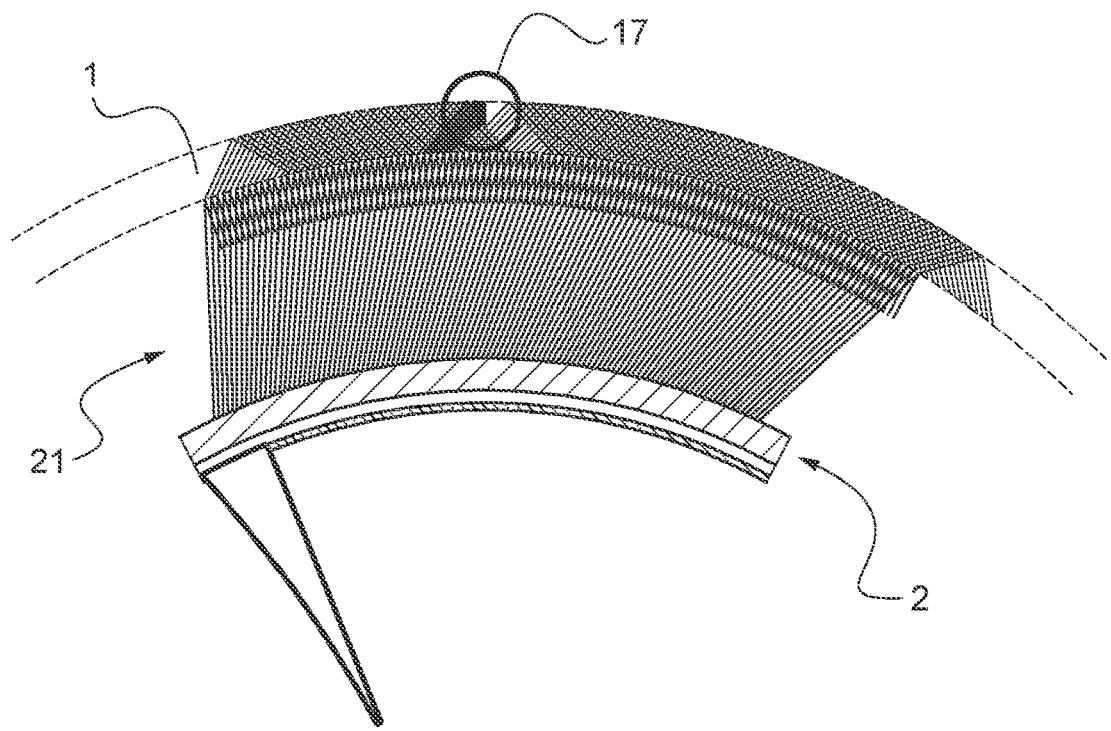
FIG. 5 is a diagrammatic representation of an example of detection of defects in the wall of a pipe by the device of the invention using a given step between each switching operation.

More specifically, the electronic control means are configured to sequentially activate the openings of the sensors 3, 4 of a given row according to the configured step between each switching operation, to allow electronic scanning according to a circumferential scanning resolution corresponding to this determined step between each switching operation. For example, FIG. 5 illustrates the electronic scanning by the sensors 4 arranged on the circumference 2 of the device, to scan the wall 1 of a pipe in which there is a defect 17 in the form of a crack or fissure, having a step between each switching operation of a value 1.

Figure 6:
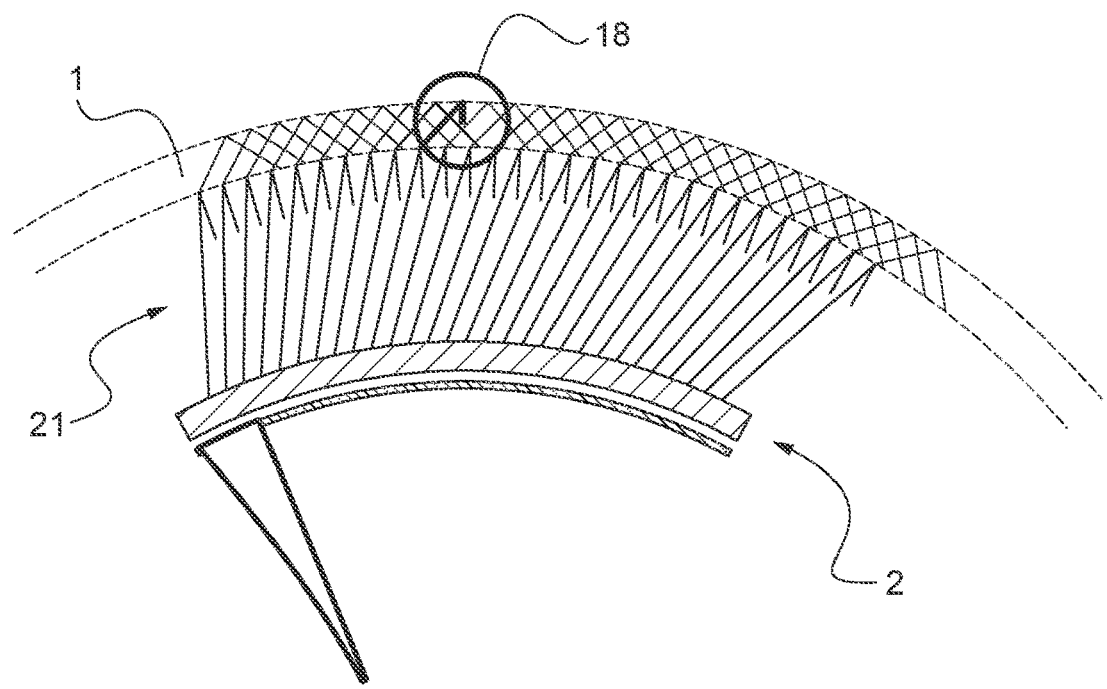
FIG. 6 is a diagrammatic representation of an example of detection of defects in the wall of a pipe by the device of the invention using another given step between each switching operation.

For its part FIG. 6 illustrates the electronic scanning by the sensors 4 arranged on the circumference 2 of the device, to scan the wall 1 of a pipe in which a defect 18 in the form of a crack or fissure exists, using a step between each switching operation of a value of 4. Thus, the circumferential scanning resolution obtained in FIG. 5 is four times finer than that obtained in FIG. 6.

Figure 4:
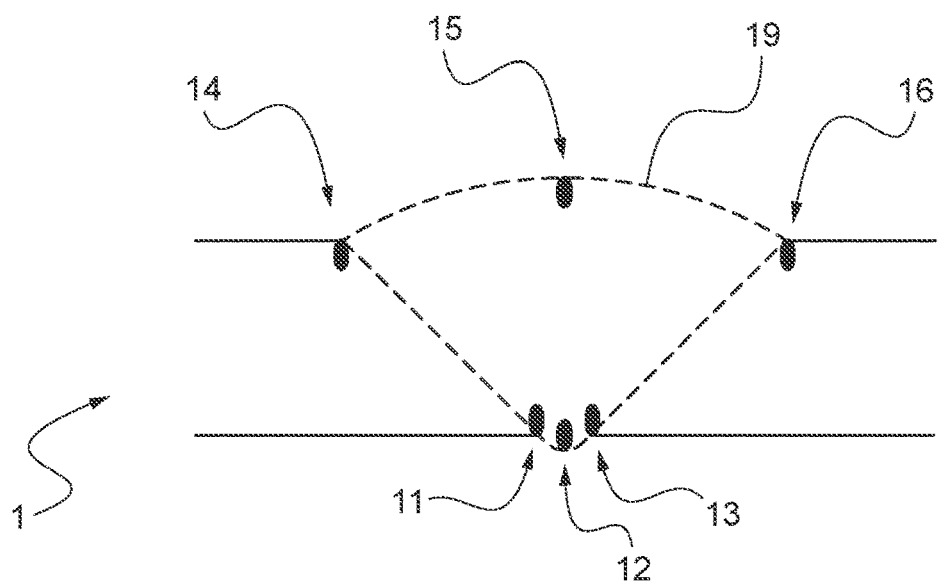
FIG. 4 is a diagrammatic representation of an example of weld volume at the wall of a pipe that can be analyzed by the device of the invention.

Furthermore, the electronic control means are configured to vary the number of transmitters and receivers used in a given sensor 3, 4, so as to vary the size of the focal spot of the projected wave beam 20, 21 by a given sensor 3, 4 at a given focal distance. Thus, the device of the invention is designed to inspect the wall 1 of a tubular pipe which must in particular transport liquids of homogeneous type (for example: water, refined hydrocarbons or certain crude oils). This device makes it possible in particular to detect, identify, dimension and locate defects 8 to 18 present in wall 1, in particular, in certain cases, defects 11 to 16 in a welded region 19 of wall 1, as illustrated in FIG. 4.

The device therefore makes it possible to detect, identify, size and locate defects such as longitudinal crack, corrosion, delamination, sinking, welds exhibiting a peak effect, in a single pass inside the pipe. Preferably, the body length of the device is less than 1.2 meters, for a pipe having a diameter of the order of 0.5 meters.

To carry out this type of inspection, the device incorporates a number of multi-element sensors 3, 4, and electronic control means configured to control these sensors 3, 4 as desired. The multi-element sensors 3, 4 are broken down into individual elements which can each be controlled independently. These sensors 3, 4 are connected to the electronic control means to control transmission and reception, independently and simultaneously, on each of the channels.

Not all sensor elements are necessarily used simultaneously. The electronic control means allow dynamic multiplexing, to distribute active elements among the elements of each sensor 3, 4. For example, the device of the invention can be configured to allow 32 transmissions and receptions simultaneously. The flexibility of configuration is thus very broad, and the device obtained has a high degree of compactness.

As seen above, in particular with reference to FIGS. 1 and 2, the first group of sensors 3 is dedicated to the production of so-called longitudinal 0° waves. This group of sensors 3, distributed in two rows in our example, makes it possible in particular to check the geometry and the thickness of the wall 1 of the pipe, using electronic scanning and electronic focusing. Also as seen above, in particular with reference to FIGS. 1 and 3 to 6, the second group of sensors 4 is dedicated to the production of so-called transverse waves having a non-zero angle of refraction, substantially equal to 45° in our example. This group of sensors 4, distributed over three rows in our example, makes it possible in particular to detect, identify and size longitudinal cracks in the wall 1 of the pipe, using electronic scanning, electronic focusing and electronic deflection.

Preferably, the transverse waves produced are produced in both directions, that is to say deflected positively or negatively with respect to the normal to the circumference 2 of the device at the point of emission. This makes it possible in particular to check the entire volume of a weld bead 19 as illustrated in FIG. 4, and to detect defects therein at critical points 11 to 16. Setting the parameters for the specific delay laws for focusing sensors 3 of the first group, and for focusing and deflection for sensors 4 of the second group is adapted to the nature and characteristics of those defects 8 to 18 in wall 1 that it is desired to be able to detect, and to the characteristics 6, 7 of the wall 1 that it is desired to check.

Variation in focus and deflection therefore allows great flexibility of detection and characterization (for example: identification, dimensioning and localization of a circumferential crack). This flexibility allows rapid discrimination of combined defects which may have their own degree of criticality. The sensors 4 of the second group can be of the linear type. Alternatively, they can be of the matrix type.

During the electronic scanning presented above, the beam 20, 21 is spatially displaced by sequentially activating different active apertures each corresponding to one or more transmitters and receivers of a given sensor 3, 4. During electronic focusing and electronic deflection, electronic delays are applied in transmission and reception on each of the channels of the corresponding sensors 3, 4, according to a focusing, respectively deflection, law configured in the electronic means of control. These delays have an effect similar to that of a focusing or deflection lens respectively and thus make it possible to focus at different depths, respectively to deflect the beam 20, 21 at different angles. This type of operation is particularly suitable for checking thick walls 1 or for checking walls 1 having a corroded surface state, or even for checking walls 1 from a location where space is very limited.

As mentioned above, in particular with reference to FIGS. 5 and 6, the setting of the step between each switching operation makes it possible to adjust circumferential resolution according to the characteristics of the defects to be detected. Also, the number of transmitters and receivers grouped together, or of openings, to form the beam 20, 21 is configurable, which makes it possible to adjust the size of the focal spot projected on the wall 1. Full coverage of the wall 1 of the pipe can thus be obtained, in the circumferential direction, thanks to the totality of the ultrasonic emissions and receptions produced and picked up by the sensors 3, 4, and controlled by the electronic control means.

The sensors 3, 4 can withstand external pressure at their front face, and offer a degree of sealing which makes it possible to guarantee atmospheric pressure at their rear, where the electronic control means can be located. These electronic control means may include one or more electronic circuit boards.

The device also includes a clock with a configurable frequency, the electronic control means being configured to trigger the measurements by the ultrasonic sensors 3, 4 at this frequency. Also, the device can comprise at least one axial odometer type sensor 5, shown in FIG. 1, the electronic control means being configured to associate the information obtained by the ultrasonic sensors 3, 4 with the position information obtained by the axial odometer type sensor or sensors 5. The axial resolution of the axial odometer type sensor(s) can be configured.

More specifically, a step between taking each measurement of position by the axial odometer type sensor(s) 5 is configurable, the electronic control means being configured to trigger measurements by the ultrasonic sensors 3, 4 according to this step between taking each measurement of position. This makes it possible in particular to produce a profile of the defects detected in the pipe. Preferably, two axial odometer type sensors are used. This gives a very high axial resolution which makes it possible to produce an even finer profile of the detected defects, with great finesse of localization.

The device preferably incorporates two means for triggering measurements which are the configurable-frequency clock mentioned above, and the sensor(s) of the axial odometer type whose resolution is configurable, also mentioned above. The combination of these two means for configuring axial resolution allows adjustment of axial resolution as a function of the characteristics of the defects to be detected.

It is also possible to provide one or more sensors for measuring the propagation speed 22 of the ultrasonic wave beams 20, 21 emitted by the ultrasonic sensors 3, 4 or ultrasonic waves emitted by the emitters of the ultrasonic sensors. The control means are then configured to receive and record the information measured by this propagation velocity measurement sensor 22. The information received from the propagation velocity measurement sensor(s) 22 is recorded by the electronic control means. This makes it possible to improve accuracy of calculation of dimensioning of the geometrical deformations and depth of cracks.

It is also possible to provide a low-frequency electromagnetic transmitter 23 which makes it possible to transmit waves to the outside surface of the pipe when the device is placed inside this pipe. Thus, it is possible to track and also to detect the device in the pipe from outside this pipe, using antennas or beacons to pick up the waves emitted by the transmitter 23.

Preferably also, centering means 24 are provided, ensuring centering of the device in the pipe. In the example shown in FIG. 1, these centering means 24 take the form of centering wheels 24.

These centering means 24 make it possible in particular to guarantee the concentricity of support of the sensors with respect to the pipe. They also make it possible to guarantee maintenance of a sufficient distance between the sensors 3, 4 and the wall 1 of the pipe, so as not to expose the sensors 3, 4 to intrusive obstacles. Thus, the sensors 3, 4 are never in contact with the wall 1.

In addition, one or more temperature sensors and one or more pressure sensors are incorporated into the device, the signals of which are recorded by the electronic control means. This allows the operating conditions of the device to be checked as part of an inspection operation.

Means for measuring angular position are also on board the device. They make it possible to obtain the angular position of the defects detected, such as the angle and the orientation of the defects of the rising, descending and straight or crooked bend type.

As mentioned above, the electronic control means comprise for example a set of various electronic circuit boards. In the case of piezo-composite type multi-element ultrasonic sensors, the electronic control means make it possible in particular to produce the electrical pulses necessary for vibrating these piezo-composite type elements, as well as for reception, amplification, filtering, and digitization of the signals produced by the various echoes returned by the wall 1 of the pipe or pipe. The electronic control means also include a digital memory assembly which makes it possible to store signals produced by the sensors 3, 4 and the various other information and data collected during inspection. The various settings, mentioned above, of the electronic control means, can be modified via a suitable interface, for example by means of computing means embedded in the device. The computing means also allow control, acquisition and extraction of the recorded data.

The device is autonomous. It includes one or more batteries offering sufficient electrical autonomy to be able to inspect long lines. Preferably, a connector is provided which makes it possible to connect an external compartment containing one or more additional batteries, in order to further increase the autonomy for the inspection of very long pipes.

Guide cups, preferably made of polyurethane, allow guiding and sealing during the movement of the device in the pipe. This therefore allows the device to advance along with the fluid transported in the pipe, in both directions.

The compactness of the device, thanks to the optimized use of detection using multi-element ultrasonic sensors-type technology, has many advantages. Thus, the weight of the device obtained is low enough to allow handling and installation by two people into the pipe, without requiring the use of lifting or handling equipment, such as a crane or a lifting arm, and to allow transport in a light vehicle.

This description is given by way of example and is not limitative of the invention. In particular, the invention is not limited to a specific number of transmitters and/or receivers in each sensor, of sensors in each row, or of rows of sensors.

What is claimed is:

1. A device for examining an interior of a pipe using multi-element ultrasound, configured to be placed inside a tubular pipe for transporting a fluid and to move under an action of the transported fluid in the pipe for detecting defects in, or checking characteristics of, a wall of the pipe, the device having a circumference and comprising a plurality of ultrasound sensors distributed over the circumference and each formed by a plurality of transmitters and a plurality of receiving antennas, the device also comprising an electronic controller configured to control each sensor, and to receive and record information measured by the sensors, wherein the sensors are grouped into:

a first group of sensors the transmitters of which are adapted to deliver a longitudinal sound wave in a first direction of incidence normal to the circumference at a position of the corresponding transmitter; and a second group of sensors the transmitters of which are adapted to deliver a transverse sound wave in a second direction of incidence forming a non-zero angle of incidence, with a normal to the circumference at the position of the corresponding transmitter;

the electronic controller is configured to control each of the sensors of the first and second groups individually, and each of the transmitters and receiver of each of the sensors, according to a configurable control program and according to the characteristics of defects to be detected in the wall and/or characteristics of the wall to be checked;

the electronic controller is further configured to apply to transmission and/or reception of the transmitters and/or receivers:

(a) of each of the sensors of the first and of the second groups, a specific delay according to a configurable focusing delay law, so as to vary electronically and in a manner specific to each of the sensors a focusing distance of a wave beam emitted by the sensor; and (b) of each of the sensors from the second group, a specific delay according to a configurable deflection delay law, so as to vary electronically and in a manner specific for each sensor an angle of incidence of a wave beam emitted by said sensor.

2. The device according to claim 1, wherein the sensors of the first group are distributed circumferentially over one or more rows, and the electronic controller is configured to allow electronic scanning by wave beams emitted by all the rows of sensors of the first group.

3. The device according to claim 1, wherein the sensors of the second group are distributed circumferentially over one or more rows, and the electronic controller is configured to allow electronic scanning by wave beams emitted by all the rows of sensors of the second group.

4. The device according to claim 2, wherein the sensors are provided with active openings facing their transmitters, and the electronic controller is configured to sequentially activate the openings of the sensors of a given row, to allow electronic scanning.

5. The device according to claim 4, wherein the electronic controller is configured to allow electronic scanning by the wave beams emitted by all the rows of sensors according to a determination between each switching operation.

6. The device according to claim 4, wherein the electronic controller is configured to sequentially activate the openings of the sensors of a given row according to the determined step between each switching operation, to allow electronic scanning according to a circumferential scanning resolution corresponding to the determination between each switching operation.

7. The device according to claim 1, wherein the electronic controller is configured to vary the number of transmitters and receivers used in a given sensor, so as to varying the size of the focal spot of the wave beam projected by the given sensor at a given focal distance.

8. The device according to claim 1, further comprising a configurable-frequency clock, and the electronic controller being configured to trigger measurements by the ultrasound sensors at the frequency.

9. The device according to claim 1, further comprising at least one axial odometer sensor, and the electronic controller being configured to associate the information obtained by ultrasonic sensors with position information obtained by the at least one axial odometer sensor.

10. The device according to claim 9, wherein the at least one axial odometer sensor is configurable between taking each measurement of position, and the electronic controller is configured to trigger measurements by the ultrasonic sensors according to the taking each measurement of position.

11. The device according to claim 1, further comprising at least one sensor configured to measure a propagation speed of the ultrasonic wave beams emitted by the ultrasound sensors or ultrasonic waves emitted by the transmitters of the ultrasonic sensors, and the controller is configured to receive and record information measured by the at least one sensor configured to measure propagation speed.

12. The device according to claim 1, further comprising a low frequency electromagnetic transmitter configured to, when the device is placed inside a pipe, transmitting to a surface outside of the wave pipe, so as to allow monitoring and detection of the device inside the pipe from outside the pipe.

13. The device according to claim 1, further comprising a centerer configured to ensure centering of the device in a pipe.

* * * * *